United States Patent
Berry et al.

(10) Patent No.: US 6,277,431 B1
(45) Date of Patent: Aug. 21, 2001

(54) ANTICHOLESTEROLEMIC EDIBLE OIL

(75) Inventors: Christopher J. Berry, Phuket (TH); Marvin L. Bierenbaum, Montclair, NJ (US)

(73) Assignees: Redeem, Inc., Tortola; MLB Enterprises, LLC, NJ (US)

( * ) Notice: Subject to any disclaimer, the term of this patent is extended or adjusted under 35 U.S.C. 154(b) by 0 days.

(21) Appl. No.: 09/411,591

(22) Filed: Oct. 4, 1999

Related U.S. Application Data

(60) Provisional application No. 60/104,227, filed on Oct. 14, 1998.

(51) Int. Cl.⁷ ................................................. A23D 7/005
(52) U.S. Cl. ........................ 426/601; 426/611; 424/439; 514/170; 552/544
(58) Field of Search .................. 426/611, 417, 426/601; 424/439; 514/170; 552/554

(56) References Cited

U.S. PATENT DOCUMENTS

| | | | |
|---|---|---|---|
| 4,393,044 | * | 7/1983 | Takada et al. .......................... 424/59 |
| 4,603,142 | | 7/1986 | Burger, et al. . |
| 4,612,187 | * | 9/1986 | Iijima et al. ........................... 424/16 |
| 5,047,254 | | 9/1991 | Lee . |
| 5,502,045 | * | 3/1996 | Miettinen ............................. 514/182 |
| 5,514,398 | * | 5/1996 | Imai et al. ............................ 426/271 |
| 5,591,772 | | 1/1997 | Lane, et al. . |
| 5,821,264 | | 10/1998 | Lane et al. . |
| 5,892,068 | * | 4/1999 | Higgins, III ......................... 552/554 |
| 5,908,940 | * | 6/1999 | Lane et al. .......................... 549/413 |
| 5,919,818 | * | 7/1999 | Lane et al. .......................... 514/458 |
| 5,958,913 | * | 9/1999 | Miettenen et al. ................... 514/182 |
| 5,985,344 | * | 11/1999 | Cherukuri et al. .................. 426/417 |
| 6,031,118 | * | 2/2000 | van Amerongen et al. ......... 552/544 |
| 6,063,424 | | 5/2000 | Wells, et al. . |
| 6,087,353 | * | 7/2000 | Stewart et al. ....................... 514/182 |
| 6,106,886 | * | 8/2000 | van Amerongen et al. ......... 426/611 |
| 6,117,475 | * | 9/2000 | van Amerongen et al. ......... 426/601 |
| 6,123,978 | * | 9/2000 | Dartey ................................. 426/602 |
| 6,123,979 | * | 9/2000 | Hepburn ............................. 426/611 |
| 6,126,943 | * | 10/2000 | Cheruvanky et al. ............. 424/195.1 |
| 6,136,349 | * | 10/2000 | Karppanen et al. ..................... 426/2 |
| 6,139,897 | * | 10/2000 | Goto et al. .......................... 426/601 |
| 6,143,770 | | 11/2000 | Lane, et al. . |
| 6,187,811 | | 2/2001 | Lane et al. . |
| 6,204,290 | | 3/2001 | Lane et al. . |

FOREIGN PATENT DOCUMENTS

| | | | |
|---|---|---|---|
| 1405346 | * | 9/1975 | (GB) . |
| WO92/19640 | * | 11/1992 | (WO) . |
| WO95/28847 | * | 11/1995 | (WO) . |
| WO96/38047 | * | 5/1996 | (WO) . |
| WO98/06405 | * | 2/1998 | (WO) . |

OTHER PUBLICATIONS

Mattson, F. H. 1977. Efect of Plant Sterol Esters on the Absorption of Dietaty Cholestrol. J. Nutr. 107:1139–1146.*
Rukmini, C. 1991. Nutritional and Biochemical Aspects of the Hypolipidemic Action of Rice Bran Oil: A Review. J. American College of Nutrition 10(6)593–601.*

* cited by examiner

*Primary Examiner*—Carolyn Paden
(74) *Attorney, Agent, or Firm*—Rod S. Berman, Esq.; Jeffer, Mangels, Butler & Marmaro LLP

(57) ABSTRACT

An edible oil is provided that decreases the synthesis, absorption and blood level of cholesterol by a human patient, increases the excretion of cholesterol from the human patient, curtails accumulation of peroxidized material in the blood of the human patient, and also increases the blood level of vitamin E in said human patient.

13 Claims, No Drawings

ANTICHOLESTEROLEMIC EDIBLE OIL

This application is based on U.S. Provisional Patent Application Ser. No. 60/104,227, filed Oct. 14, 1998, the disclosure of which is incorporated in its entirety herein by reference.

FIELD OF THE INVENTION

The present invention relates to an edible oil that is useful in improving blood lipid levels in a human patient, and to methods for making and using the oil.

BACKGROUND OF THE INVENTION

More than 750,000 people in the United States die from coronary heart disease and strokes every year. About 1.25 million people have heart attacks every year, half of which occur without warning. Coronary heart disease is the most frequent killer of men and women in the United States. Despite a century of drug development, ten times as many Americans die of heart attacks as at the turn of the century.

According to the American Heart Association, cholesterol levels are the major predictors of cardiovascular disease. Cholesterol, a soft, waxy substance found among the lipids in the blood stream, is an important part of a healthy body because it is used to form cell membranes, some hormones and other needed tissues. However, a high level of cholesterol in the blood (hypercholesterolemia) is a major risk factor for coronary heart disease, which leads to heart attack.

Cholesterol is insoluble in the blood, and must be transported to and from the cells by a special carrier of lipids and proteins called lipoproteins. There are several kinds of lipoproteins, the most important of which are low-density lipoprotein (LDL) and high-density lipoprotein (HDL).

Low-density lipoprotein is the major cholesterol carrier in the blood. Excess LDL cholesterol circulating in the blood can slowly build up within the walls of the arteries feeding the heart and brain. Together with other substances it can form plaque, a thick, hard deposit that can clog those arteries. This condition is known as atherosclerosis. The formation of a clot (or thrombus) in the region of this plaque can block the flow of blood to part of the heart muscle and cause a heart attack. If a clot blocks the flow of blood to part of the brain, the result is a stroke. A high level of LDL cholesterol reflects an increased risk of heart disease. Thus, LDL cholesterol is often called "bad cholesterol."

High density lipoprotein ("HDL") carries about one-third to one-fourth of blood cholesterol. It is believed that HDL carries cholesterol away from the arteries and back to the liver, from which it is ultimately passed from the body. Some experts believe HDL removes excess cholesterol from atherosclerotic plaques and thus slows their growth. HDL is known as "good cholesterol" because a high level of HDL seems to protect against heart attack. The opposite is also true: a low HDL level indicates a greater risk.

Cholesterol comes from two sources. It is produced in the body, mostly in the liver (about 1,000 milligrams a day), and is also found in foods that come from animals, such as meat, poultry, fish, seafood and dairy products. Foods from plants (fruits, vegetables, grains, nuts and seeds) do not contain cholesterol.

Saturated fatty acids are the chief culprit in raising blood cholesterol, which increases the risk of heart disease. But dietary cholesterol also plays a part. The average American man consumes about 360 milligrams of cholesterol a day; the average American woman, between 220 and 260 milligrams.

One hundred (100) million adults have blood cholesterol levels of 200 milligrams per deciliter (mg/dl) or higher, and nearly 40 million Americans have levels of 240 mg/dl or above. It is estimated that there are 53 million Americans with LDL levels that require treatment, but that less than one-third of those in need are receiving the necessary treatment. Furthermore, most patients who are treated fail to attain treatment goals. The yearly cost of treatment is estimated at more than $100 billion, yet coronary heart disease still remains the No. 1 killer of Americans.

Thus, the risk of having a heart attack or stroke is strongly predicted by the amounts of low-density lipoprotein (LDL), high-density lipoprotein (HDL), and triglycerides in the blood.

Cholesterol and triglyceride levels can be reduced through medical intervention and/or dietary modification, such as reduction of the dietary intake of cholesterol and saturated fats. However, some dietary modifications have given rise to new problems. For example, in recent years the substitution of margarine for butter has been promoted. Butter is high in cholesterol and saturated fats. Stick margarine, on the other hand, has a semi-solid consistency based on their content of hydrogenated oils. The hydrogenation process, however, forms trans fats. Clinical studies have demonstrated that trans fats are atherogenic, causing two to three times the cardiovascular risk of the naturally saturated fats which give butter its stability. The health advantage of margarine over butter is now suspect in that margarine, particularly stick margarine, can contain 20% to 30% of trans fats. The American Heart Association now recommends soft margarine. Such margarine, so called trans-free margarine, which is formulated from either completely hydrogenated palm oil or palm oil fractions, has been introduced recently. This margarine, while free of trans fats, contain increased levels of saturated fats, the second most dangerous component of margarine.

Other compounds have been reported to reduce cholesterol levels in humans. For example, plant sterols, particularly beta-sitosterol, have been reported to have anticholesterolemic effects, and are believed to inhibit cholesterol absorption in the small intestine. Plant sterols are thought to displace cholesterol in bile salt micelles. Approximately half of the dietary cholesterol ingested is absorbed whereas less than 5% of beta-sitosterol is absorbed. When the plant sterols displace cholesterol of the bile salt micelles, the cholesterol is fecally excreted.

Plant sterols exist naturally in saturated and unsaturated forms, as free alcohols and as esters. The unsaturated forms dominate. It is known that natural sitosterols may be converted to sitostanols by hydrogenation, and it has been reported that stanols are more effective per unit weight than sterols in blocking cholesterol absorption and that stanols are not absorbed. Further, the amount of beta-sitosterol absorbed appears to be relatively constant even when doses administered vary by an order of magnitude. Both sterols and stanols have been used as relative markers of cholesterol absorption because of their unabsorbability. However, it seems clear that while sitostanol is completely unabsorbed, some sitosterol is.

Further, the addition of sitostanol to the diet reduces not only cholesterol absorption but also sitosterol and vitamin absorption. Some have characterized this as an advantage, but the fact that sitostanols block the normal absorption of micronutrients may be problematic.

The Lancet 1995; 345: 1529–1532, reported on the use of beta-sitosterol (20 milligrams per day) for the treatment of benign prostatic hyperplasia (BPH). This condition is a slow enlargement of the fibromuscular and epithelial structures within the prostate gland, eventually leading to obstructive urinary symptoms which are experienced to some extent by most men over the age of 50 years. Using sitostanols alone as an anti-cholesterolemic thus may increase the risk of BPH.

Other compounds that have been studied in connection with the treatment and prevention of diseases including arteriosclerosis and high cholesterol levels include tocotrienols, which are natural forms of vitamin E found in wheat germ, rice bran, oats and palm.

In vitro, the concentration-dependent impact of tocotrienols on cholesterol can be demonstrated to involve post-transcriptional down regulation of 3-hydoxy-3-methyl-glutaryl coenzyme A reductase (HMGCoA reductase) activity. This is the enzyme targeted by statins, the anti-cholesterolemic drug with annual sales of eight (8) billion dollars in the U.S. alone. Statins act directly, blocking HMGCoA reductase. However, statins also sometimes cause liver dysfunction.

Unfortunately, many patients taking statins or tocotrienols respond to the decreased rate of cholesterol synthesis by a compensatory increase in the rate at which dietary cholesterol is absorbed from food. A recent study reports that 80% of patients taking statins as a monotherapy failed to reach treatment goals. With respect to statins, increasing the dosage to the levels frequently required to overcome compensatory increase in cholesterol absorption, produces an 11-fold increase in the incidence of liver complications as noted above. Because of the risk of liver complications, statins must be taken under a doctor's supervision. Similarly, while tocotrienols have shown promise in vitro, the results of clinical trials have been equivocal. Qureshi, *Am. J Clin. Nutr.* 53: Suppl. 4: 1021S–1026S, (April 1991 ) reported significant improvements in lipid parameters amongst "responders" in a short study, but three subsequent studies of free living patients supplemented with the same material (palm-derived tocotrienol-rich fraction, i.e., palm-derived TRF) failed to confirm his results. See Antila, et al, Helsinki Antioxidant Symposium, 1991 Wahlquist, M., et al, *Nutrition Research* 12: Suppl. 1: S181–S201 (1992); Tomeo, A., et al., *Lipids* 30: 1179–1183, 1995] In response, Qureshi has suggested Qureshi, A., et al, *Lipids* 30 (12): 1171–1177, (1995) that d-tocopherol inhibits the anticholesterolemic effect of tocotrienols. The results of clinical trials with oils according to the present invention do not support this conclusion, but rather show that synergy with other non-saponifiable components is required to effect blood lipid modulation.

A margarine recently introduced in Finland, Benecol, that contains hydrogenated plant sterols extracted from pulp and paper waste, has been found to achieve a 10–15% reduction in cholesterol levels in patients substituting Benecol margarine for standard margarine in their diets. This reduction corresponds to a twenty to thirty percent decrease in cardiovascular risk. However, Benecol suffers from the disadvantage that the plant sterol extracts require regulatory approval in the United States and other countries as a new food additive.

Toxic forms of oxygen have been associated with many chronic, debilitating diseases. These include cardiovascular, neoplastic, arthritic, age related macular degenerative and progeria, among others. As tissue levels of these toxic forms of oxygen rise, tissue levels of protective antioxidants, such as antioxidants of the vitamin E family, decline. These risk factors have been confirmed in the case of cardiovascular disease by Gey, who showed that as blood vitamin E values decrease in a population, the incidence of ischemic heart disease rises. To assess the blood levels of peroxides, many researchers have measured adducts of thiobarbituric acid (a.k.a TBARS, thiobarbituric acid reactive substances, also called malonaidehyde modified material), or peroxides. Holvoet, Collen and van de Werf recently documented the relation of malonaldehydemodified LDL as a marker of acute coronary syndromes. These scientists showed that malonaldehyde (TBARS) type pollution in the blood indicates endothelial injury and plaque instability, and more accurately indicates acute coronary syndromes than other commonly used indices, such as troponin 1. In an intervention study of patients who had had at least one stroke who were supplemented daily with Redeem, their serum levels of TBARS material decreased significantly from pre-study values. See: Tomeo, A. C., el al. Antioxidant effects of tocotrienols in patients with hyperlipidemia and carotid stenosis. Lipids 30: 1179–1183, 1995; Watkins, T. R. et al. Hypocholesterolemic and antioxidant effects of rice bran oil non-saponifiables in hypercholesterolemic subjects. Environ. Nutr. Interactions, 3: (2) 1–8, 1999]. Further, their serum vitamin E levels nearly doubled over pre-study values. This same group of researchers of the Jordan Heart Research Foundation had previously documented the same relation in the laboratory rat model. See: Watkins, T. R., et al γ-tocotrienol as a hypocholesterolemic and antioxidant agent in rats fed atherogenic diets. Lipids, 28: 1113–1118, 1993].

Accordingly, there is a need for an edible oil that is trans-free, low in saturated fats and suitable for use in the manufacture of margarine. Preferably, the edible oil does not require additives that must be chemically processed (e.g., hydrogenated).

There is also a need for an edible oil product that is a safe, effective alternative to known oil products and that can be made available over-the-counter (OTC) or incorporated into staple foods.

Furthermore, there is a need for a new intervention strategy against cardiovascular disease, one which recognizes the difficulty patients have in changing life-long bad eating habits and which, unlike cardiovascular drugs, is safe enough to be taken without direct medical supervision.

SUMMARY OF THE PREFERRED EMBODIMENTS

In accordance with one aspect of the present invention, there is provided an edible oil that reduces the synthesis and absorption of cholesterol by the human patient and promotes the excretion of cholesterol from the human patient.

Preferably, the edible oil is substantially free of trans fatty acids.

In preferred embodiments, the inventive oils are vegetable oil or mixtures of vegetable oils. Very preferably, the inventive oils are refined rice bran oils or mixtures of rice bran and palm oils.

In accordance with still other aspects of the present invention, there are provided food products that include any of the foregoing oils.

According to additional aspects of the present invention, there are provided methods of reducing total cholesterol and LDL and raising HDL in a human patient comprising the step of administering to said patient an effective amount of any of the foregoing oils.

According to still another aspect of the present invention, there is provided a method of making an anticholesterolemic edible oil. The method includes the steps of providing an edible oil, and adjusting the content of tocopherols, tocotrienols, free sterols, steryl esters and cycloartenols of the edible oil such that the oil, when consumed at a pre-selected dosage and in a pre-selected dosage form, provides on a daily basis about 25 to 750 mg of tocopherols, tocotrienols or combinations thereof, about 5 to about 500 mg of steryl esters, and about 5 to about 500 mg of cycloartenols.

In a preferred embodiment, a crude vegetable oil ("Oil A"), in particular a crude rice bran oil, is dewaxed and degummed, and held under vacuum at elevated temperature. Free fatty acids are then removed from Oil A at mild pH using an alkaline hydrous sodium silicate and small quantities of potassium hydroxide so that the free fatty acids are converted to soap (saponified) at conditions which minimize the loss of esters of sterols and cycloartenols to the soap stock. Next, a tocotrienol-rich distillate, preferably a rice bran or palm oil deodorizer distillate, is substantially saponified, preferably in isopropanol, and the non-saponifiable fraction is extracted, preferably with hexane and water to yield an extract ("Oil B"). Finally, appropriate portions of Oil A and Oil B are mixed to produce a product having the desired concentration of tocopherols, tocotrienols, free sterols, steryl esters and cycloartenols.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

Cholesterol levels in the human body are regulated by three concurrent mechanisms, namely synthesis, absorption and excretion. Most known anti-cholesterolemic compounds and compositions target only one of these mechanisms, and thus must have a relatively large impact on the targeted mechanism in order to function.

Edible oils according to the present invention reduce the synthesis and absorption of cholesterol while increasing the excretion of cholesterol. All three mechanisms are affected simultaneously, resulting in a gentle, balanced improvement in LDL, HDL and triglyceride levels.

Reductions and increases in cholesterol synthesis, absorption and excretion in human patients are determined by comparison with the same quantities measured in human patients before and after administration of edible oils according to the invention.

The edible oils, according to the invention, can be characterized as "functional foods," as opposed to drugs or nutraceuticals. Functional foods have been defined by the European Union as "ordinary foods processed or modified in such a way that they have scientifically documented health promoting effects and can be marketed with a health claim." In Japan, "functional foods" are defined as ordinary foods that are derived only from naturally occurring ingredients and that are consumed as part of the diet and not in supplement form (i.e., not as tablets or capsules).

Preferably, the edible oil according to the invention includes at least one compound that reduces cholesterol synthesis in a human patient, such as at least one tocotrienol.

Specific examples of such compounds include α-tocotrienol, β-tocotrienol, γ-tocotrienol and δ-tocotrienol.

The edible oil also preferably includes at least one compound that reduces cholesterol absorption in a human patient, for example, at least one free sterol or steryl ester. Specific compounds useful according to the invention include ferulic and fatty acid esters of campesterol, β-sitosterol and other sterols and stanols.

Preferably included in the inventive oil is at least one compound that promotes cholesterol excretion in a human patient. Such compounds include cycloartenol esters of ferulic acid ($C_{10}H_{10}O_4$), variously referred to as 3-(4-hydroxy-3-methoxyphenyl)-2-propanoic acid, 4hydroxy-3-methoxy-cinnarnic acid or 3-methoxy-4-hydroxy-cinnamic acid. Specific examples of these compounds include ferulic esters of 24-methylene-cylcoartenol and cycloartenol.

The edible oil, according to the invention, preferably attenuates the accumulation in and blood level of peroxidized lipid—and other substrates, such as protein, carbohydrate and nucleic acid—called peroxides, but also called on analysis TBARS (thiobarbituric acid reactive substances) and malonaldehyde-like compounds (i.e., TBA), known cardiovascular risk factors.

Very preferably, the edible oil provides at least one compound which limits the formation and accumulation of TBARS, and similar peroxidation adducts, in a human patient.

According to the invention, the edible oil also provides vitamin-E like activity, whether derived from the tocotrienol or tocopherol family, which confers antioxidant activity to tissues, such as the blood, which can be measured as tocotrienol or tocopherol.

And, very preferably, at least one compound in the oil is derived from the tocotrienol or tocopherol family (as described in detail herein), which results in elevated serum tocopherol or tocotrienol levels in the blood of a human patient at risk of cardiovascular disease.

The tocopherols, tocotrienols, sterols, steryl esters and cycloartenols employed according to the invention are preferably derived from natural sources, but can also be synthetically produced, if desired. In particular, one or more of the ingredients can be synthetic or can be derived from a source other than the vegetable oil base.

Very preferably, the inventive oil is substantially free of trans fatty acids. "Substantially free" as used herein means less than about 2% (weight/weight). Optimally, the inventive oil includes no trans fatty acids.

It has been discovered in clinical trials that the optimal ratio of (i) tocotrienols and/or tocopherols to (ii) free sterols and/or steryl esters to (iii) cycloartenols ranges from about 1:0.5:0.05 to 1:5:0.5, and very preferably is about 1:1:0.05. Thus, in a preferred embodiment, the ratio of the foregoing ingredients in the inventive oil falls within this preferred range, and optimally is about 1:1:0.05.

The amount of tocopherols and tocotrienols administered to a human patient preferably ranges from about 50 to 500 mg per day, or alternatively, about 10 to 200 mg/dosage unit. The amount of sterols and steryl esters likewise preferably ranges from about 50 to 500 mg/day. The amount of cycloartenols preferably ranges from about 2.5 to 25 mg per day. In a preferred embodiment, a human patient is administered about 400 milligrams of tocopherols and tocotrienols, 400 milligrams of sterols and steryl esters and 20 milligrams of cycloartenols. This corresponds to the preferred ratio of ingredients of about 1:1:0.05. The percentages of the various ingredients in the inventive oil can vary within a wide range, so long as the proportions of the ingredients are within the stated ranges and the patient consumes a total amount of each ingredient within the stated ranges each day.

In a preferred embodiment, the edible oil according to the invention is a vegetable oil, in particular a refined rice bran oil or a mixture of refined rice bran oil and palm oil.

Very preferably, the edible oil is a refined rice bran oil. Crude rice bran oil contains the highest percentage of non-saponifiables of any commercial vegetable oil. Total non-saponifiables often exceed 4% (by weight), approximately four times more than the oils currently used in margarine manufacture.

Crude rice bran oil is preferably refined for use according to the invention. When the oilbearing bran is separated from rice, a particularly active lipase enzyme is activated which causes a very rapid increase in free fatty acids. Even when the rice is stabilized by heat or chemicals shortly after milling, free fatty acid (FFA) levels of 5 to 10% are common; industrial rice bran oils may have FFA levels as high as 30%. There is furthermore, a seasonal variation in FFA levels. Wax levels are also high and generally related to the temperature at which the bran is extracted with solvent. Rice bran oil thus is among the most challenging of oils to refine. Industrially, rice bran oil is processed by chemical refining.

Palm oil, another useful source of tocotrienols, also has high FFA levels because palm fruit releases a lipase enzyme when bruised. FFA levels of palm oil range from 2% to 5%. Most commercial production of palm oil uses physical refining processes. However, such refining methods produce low-grade distillates of low tocopherol/tocotrienol concentration, typically 3,000–5,000 ppm. Deodorizer distillates obtained from chemical refineries are of higher concentration, typically 1 to 3% tocopherol/tocotrienol. However, during the chemical refining process, the ferulic and fatty acid esters of sterols and cycloartenols are ionized and lost to the soap stock. Free sterols, and triterpene alcohols (cycloartenols) are soluble to various extents in both polar and non-polar solvents, whereas non-polar solvents are selective with respect to their esters of fatty acids and ferulic acids. These molecules are structurally similar to cholesterol. In the ester form they more readily displace cholesterol from the micelles in the digestive tract, but are themselves not absorbed, or if absorbed, quickly excreted.

Thus, while a tocotrienol-rich fraction can be recovered from chemically refined rice deodorizer distillate, it is substantially depleted of these useful esters.

Known processes for production of tocopherol and tocotrienol-rich fractions from deodorizer distillates include processes such as ion exchange, saponification and extraction from hard soap, methyl esterification, esterification of free fatty acids and molecular distillation, and desterolization. In each of these processes, the method of separation of tocotrienol-rich concentrates purposely or incidentally removes the natural steryl esters of ferulates and cycloartenols.

As crude rice bran oil ages, it has been observed that the free sterols become esterified with free fatty acids. It has been discovered that this process can be accelerated by aging the oil at elevated temperatures under vacuum, under mild conditions such that the free sterols and free cycloartenols are esterified and the tocopherols are not. Rogers, et al, J. Am. Oil Chem. Assoc., 70: No. 3, 1993, analyzed five commercially available rice bran oils from different manufacturers. The content of ferulic esters of cycloartenols and plant sterols (quantitated as oryzanols) ranged between 115 ppm and 787 ppm, with an average of 400 ppm. In the same oils, tocotrienol content ranged between 72 ppm and 1157 ppm, with an average of 500 ppm. More than 95% of the oryzanols and 60% of the tocotrienols are lost in conventional refining processes. To obtain effective amounts of the anticholesterolemic active principles, a patient could be required to consume more than a kilogram of oil per day.

The invention thus meets the need for a new process in which the optimal proportions of tocotrienols, steryl esters and cycloartenols are retained in the product and the sterols present are substantially in the form of steryl esters whose increased solubility in lipids underlies the efficacy of the compound in decreasing the absorption of dietary cholesterol.

In general, the inventive method begins with crude rice bran oil ("Oil A"), which is dewaxed and degummed, and free sterols and triterpene alcohols esterified with free fatty acids. The remaining free fatty acids are then removed under conditions that preserve the esterified state of the sterols and cycloartenols, by distillation or at mild pH using an alkaline hydrous sodium silicate and small quantities of potassium hydroxide so that the free fatty acids are converted to soap (saponified) at conditions which minimize the loss of esters of sterols and cycloartenols to the soap stock. Next, a tocotrienol-rich deodorizer distillate, preferably of rice bran or palm oil, is substantially saponified in isopropanol and the non-saponifiable fraction is extracted with hexane and water to produce and extract ("Oil B"). Finally, appropriate portions of Oil A and Oil B are mixed to form a product having the required concentration of tocopherols, tocotrienols, free sterols, steryl esters and cycloartenols.

In contrast to products such as Benecol, which include synthetic ingredients requiring regulatory approval, preferred embodiments of the edible oils according to the present invention, such as refined rice bran oil, raise no regulatory issues since they naturally contain suitable steryl and stanyl esters, which, unlike Benecol, do not require hydrogenation and chemical processing with attendant risks of trans fatty acid formation.

The edible oils according to the invention can be incorporated into a variety of food products, including, without limitation, butter, margarine, ice cream and mayonnaise-chocolate products; liquid such as soybean milk and rice milk- and water-based drinks such as wines and mineral waters. The inventive oils are also suitable for encapsulation in gelatin shells to form soft gels. Regardless of the particular form in which the inventive oil is prepared, the daily dosage of the various ingredients to a human patient should fall within the ranges set forth above. Depending on the concentration of the inventive oil in the given form, the total amount of the food product per serving, or encapsulated oil, etc., will also vary. Highly concentrated forms, such as soft gels, will be administered in lower total amounts than diluted forms, such as drinks.

The invention is further illustrated by the following non-limiting examples. Example 1 discloses a method for the preparation of an embodiment of the inventive oil. Examples 2, 3, 4 and 5 compare the results of human studies in which patients received the inventive oil or other preparations containing the elements of the inventive oils individually or in proportions which differ substantially from those of the invention. Example 2 compares the administration of palm-derived tocotrienols with the inventive oil.

Example 3 compares rice tocotrienols processed by another method with the inventive oil. Example 4 compares a conventionally processed rice oil with the inventive oil. Example 5 compares the performance of the inventive oil against two commercial margarines incorporating high levels of sterols and steryl esters.

In each case, it is demonstrated that the desired changes in blood lipid values are achieved only when the proportions of the active components are according to the invention. It is shown that the inventive oil is markedly superior, decreasing LDL levels and uniquely superior in elevating HDL and diminishing triglyceride values.

EXAMPLE 1

One hundred (100) grams of rice oil ("Oil A") are analyzed, dewaxed and degummed, and the acid value of the oil is determined by AOAC methods. The oil contains 5% sterols, stanols, and cycloartenols as:

| | |
|---|---|
| Campesterol | 15% |
| Sitosterol | 10 |
| Campestanol | 1.4 |
| Stigmasterol | 1.5 |
| Sitostanol | 1.5 |
| Cycloartenol | 30 |
| 24-methylene-cycloartenol | 40 | and, further, contains 1120 ppm of tocopherols and tocotrienols, 58% as gamma-tocotrienol. Oil A is held overnight at moderate vacuum at 125° C., so that water generated during esterfication is removed and the reaction driven to the right, accelerating the natural aging process in which fatty acid esters of sterols and cycloartenols are formed. Oil A is then cooled to 50° C.

A mild, caustic agent is prepared by combining potassium hydroxide and alkaline hydrous sodium silicate (Britesorb® NC, commercially available from PQ Corporation, Valley Forge, Pa.) in a slurry, in the ratio of 1 part potassium hydroxide to 4 parts Britesorb® to 6 parts of water. An amount of slurry equal to 5% stoichiometric excess of the acid value previously measured is added to the cooled Oil A above, and the mixture is stirred at 60° C. for one hour, after which the temperature is increased to 80° C. and the mixture filtered.

The refined oil is washed and dried, leaving a neutral oil rich in sterol esters and cycloartenol esters of ferulic acids, but substantially free of free fatty acids and free sterols.

Next, a deodorizer distillate from chemical refining of rice bran oil is obtained and analyzed. The distillate is found to contain the following ingredients:

2.0% tocopherols and tocotrienols, including:

| | |
|---|---|
| α-tocopherol | 0.5% |
| γ-tocopherol | 0.4% |
| α-tocotrienol | 0.1% |
| γ-tocotrienol | 1.0% |
| 8.0% | sterols, total |
| 2.0% | steryl esters |

75.2% glycerides, total, including:

| | |
|---|---|
| free fatty acids | 43.5% |
| monoglycerides | 6.7% |
| diglycerides | 8.6% |
| triglycerides | 16.4% |

The distribution of fatty acids is as follows:

| | |
|---|---|
| C12:0 | 0.1%(byweight) |
| C14:0 | 1.0 |
| C16:0 | 27.5 |
| C16:1 | 0.3 |
| C18:0 | 2.0 |
| C18:1 | 39.0 |
| C18:2 | 27.0 |
| C18:3 | 0.8 |
| C20:0 | 0.8 |
| C20:1 | 0.6 |
| C22:0 | 0.2 |
| C24:0 | 0.4 |

Next, 50 grams of the distillate is mixed with 5 volumes of isopropanol and the saponification calculated from the analysis above using the AOAC method. Then an amount of 80% potassium hydroxide at 150% of the calculated stoichiometric weight required to saponify all of the glyceride components is determined, and is added slowly to the reaction mixture. The reaction mixture is held in a water bath for 30 minutes at 60° C. and allowed to cool, then neutralized and extracted with 10 volumes of hexane and 20 volumes of water over night. The hexane phase is separated, washed and dried, and the semi-solid resultant phase ("Oil B") is combined with the neutral oil obtained above. The resultant refined oil is enriched in tocopherols and tocotrienols, and esters of cycloartenols and sterols, but depleted of free fatty acids, mono-, di- and triglycerides and free sterols.

Optionally, the semi-solid resultant phase above can be de-sterolized by precipitating free sterols from methanol in 4° C., and further concentrated by distillation, prior to blending.

The yield of tocopherols and tocotrienols ranges between 45% and 75%, depending upon the degree of saponification of the reaction mixture. The ratio of tocotrienols and tocopherols to cycloartenols and ferulic and sterol esters can also be adjusted by the degree of saponification.

The ratio of Oil A and Oil B combined can be varied to produce a re-proportioned oil ranging in concentration of tocopherols and tocotrienols between about 0.5% and 25% (weight/weight, based on the total weight of the oil). At higher concentrations, the oil is suitable for encapsulation into soft gels as a nutraceutical or therapeutic. At lower concentrations, the oil can be incorporated directly into food products, such as margarine or mayonnaise. In each case, the desired concentration is that sufficient to provide between 50–500 mg/day (or, alternatively, about 20–200 mg/serving) of tocotrienols/tocopherols to a patient consuming the product.

EXAMPLE 2

A test group was administered a palm oil-derived tocotrienol-rich fraction (TRF), processed in a manner which depletes sterols, steryl esters and cycloartenols, in an amount of 160–240 mg three times per day for one year. Tomeo, A., et al Lipids 30: 1179–1183, 1995. The dosage was increased to 240 mg of tocotrienols three times per day for two additional years. Kooyenga, D., et al. Asia Pacific J Clin. Nutr. 6: 72–75, 1996. No change in total cholesterol, LDL or HDL cholesterol, or triglyceride levels was observed for two years. The test group was then administered 2.4 grams per day of an oil according to the invention containing 200 mg of tocotrienols three times per day for one year. The blood lipids improved: a 20% decrease in LDL cholesterol, a 20% increase in HDL cholesterol and a 23% decrease in triglycerides was observed. See Table 1.

TABLE 1

Changes in blood lipids during supplementation with palm-derived tocotrienol or the invention, rice bran tocotrienols with non-saponifiables. Data in mg/dl. N = 50 subjects.

| Lipid | Palm tocotrienol period | | | The invention |
|---|---|---|---|---|
| | Baseline (start) | Year 1 | Year 3 | Year 4 |
| Cholesterol, total | 239 | 239 | 239 | 206* |
| LDL cholesterol | 165 | 165 | 165 | 132* |
| HDL cholesterol | 40 | 40 | 40 | 48* |
| Triglycerides | 211 | 211 | 211 | 162* |

*Data of years 3 and 4 differ significantly, $p < 0.01$.

EXAMPLE 3

Ten members of the study of Example 2 were switched to NuTriene®, a tocotrienol-rich concentrate from rice oil manufactured by Eastman Chemical Company, processed in a manner that depletes the oil of steryl esters and cycloartenols. The lowering of LDL cholesterol observed in Example 2 was maintained, but 25% of the increase in HDL cholesterol levels and 50% of the decrease in triglycerides was lost. See Table 2.

TABLE 2

Changes in blood lipids in subjects supplemented with the invention, rice bran tocotrienols and non-saponifiables, or NuTriene ®, between years 4 and 5. Data as mg/dl. N = 10.

| Lipid | Year 4 (end) | Year 5 (end) |
|---|---|---|
| Cholesterol, total | 206 | 205 |
| LDL cholesterol | 132 | 127 |
| HDL cholesterol | 48 | 46 |
| Triglycerides | 162 | 187 |

EXAMPLE 4

Patients were administered a margarine prepared from a physically refined rice oil rich in sterols, steryl esters and cycloartenois (1.5 grams total per day) but poor in tocotrienols (2.5 mg per day). No change in blood lipid values was observed. Weststrate, J. A., et al European J. Clin. Nutr. 52: 334–343, 1998. See Table 3.

TABLE 3

Percent change in blood lipid components in patients administered sterol and stanol esters and tocotrienols from a physically refined rice bran oil compared with those obtained with the inventive oil.

| Lipid | Rice bran oil* | The invention** |
|---|---|---|
| Cholesterol, total | −1.1 | −14 |
| LDL cholesterol | −1.5 | −20 |
| HDL cholesterot | −1.3 | +20 |

TABLE 3-continued

Percent change in blood lipid components in patients administered sterol and stanol esters and tocotrienols from a physically refined rice bran oil compared with those obtained with the inventive oil.

| Lipid | Rice bran oil* | The invention** |
|---|---|---|
| LDL/HDL cholesterol | −0.3 | −28 |

*1.5 g/d in 30 g oil providing 2.5 mg/d tocotrienols. ** As described above.

EXAMPLE 5

The patients of Example 4 were switched to margarine preparations containing either stanol esters (Benecol) or steryl esters. Both groups received margarine containing approximately 3 grams per day of the stated esters. Decreases of LDL cholesterol concentrations between 8% and 13% were observed, but no significant changes in HDL cholesterol or triglycerides were found. This study confirms the findings of other studies of sitostanol esters but reported significant depletion of plasma antioxidants. Miettinen, T. A. et al New Engl. J Med 333: 1308–1312, 1995; Weststrate, J. A., et al. Eur. J Clin. Nuir. 52: 334–343, 1998. See Table 4.

TABLE 4

Percentage change in blood lipids in patients administered sterol and stanol esters compared with those obtained with the inventive oil.

| Lipid | Steryl esters* | Stanol esters** | The inventive oil*** |
|---|---|---|---|
| Cholesterol, total | −8.3 | −7.3 | −14 |
| LDL cholesterol | −13 | −13 | −20 |
| HDL cholesterol | n.s. | n.s. | +20 |
| Triglycerides | n.s. | n.s. | −23 |
| LDL/HDL chol. | −14 | −12 | −28 |

*Steryl esters: 3 g/d in 30 g oil; 0 mg/d tocotrienols. Stanol esters: 3 g/d in 30 g oil; 0 mg/d tocotrienols. *As described above.

CONCLUSION

The foregoing data demonstrate that the control of the amounts of tocotrienols/tocopherols, steryl esters, free sterols, and cycloartenols according to the invention modulate blood lipid values in an optimally therapeutic manner. The results in Example 2 show that the administration of tocotrienols alone does not affect blood lipid values. Example 2 further demonstrates that administration of an edible oil according to the invention lowers total cholesterol, LDL cholesterol and triglycerides, while increasing HDL cholesterol. Example 3 demonstrates that a rice-derived tocotrienol concentrate depleted in steryl esters and cycloartenols is ineffective in increasing HDL levels or decreasing triglycerides. Example 4 shows that a physically refined rice oil poor in tocotrienols is ineffective, and Example 5 shows that administration of sterols and steryl esters without tocotrienols does not result in changes in HDL or triglyceride values.

The decreases in serum total cholesterol and LDL cholesterol achieved by patients administered the oil according to the invention are comparable to the best results achieve by drug therapy. The increase in HDL cholesterol levels of 20% and the decrease in triglycerides of 23% are particularly significant. Watkins, T. et al. Environmental Nutr. Interactions 3:8–18, 1999. The total cholesterol (TC)/HDL cholesterol ratio has been found to be a superior measure of risk of coronary heart disease compared with either total cholesterol or LDL cholesterol levels alone. In the Framingham study, the eight-year likelihood ratios for coronary heart disease increased 10 times in men with the lowest TC/HDL ratios compared with men with the highest ratios. Kinosian, B. et al L J Invest Med 43.-443–450, 1995. On average, the TC/HDL ratio of patients administered the oil according to the invention decreased by 28% from 5.97 to 4.29. The potential impact of the inventive oil to improve the public health is self-evident. A fifty-year-old man who achieves the 28% reduction in TC/HDL ratios reported in the clinical trial with the inventive oil is twice as likely to live beyond the age of 75 years.

The foregoing examples are for illustrative purposes only, and do not in any way limit the scope of applicants' invention which is identified by the claims appended below.

We claim:

1. An edible oil comprising i) about 10 to 30% of tocopherols, tocotrienols or combinations thereof, ii) about 2 to 20% of free sterols; iii) about 2 to 20% of sterol esters; iv) about 0.1 to 1.0% of cycloartenols; and, v) about 7 to 19% of saturated fats, wherein all percentages are weight/weight.

2. The edible oil of claim 1 comprising about 70 to 80% of total fats.

3. The edible oil of claim 1 comprising less than 2% trans fatty acids.

4. The edible oil of claim 1 comprising about 20 to 60% of non-saponifiable components.

5. The edible oil of claim 1 which is a vegetable oil or a mixture of vegetable oils.

6. The edible oil of claim 1 which is a refined rice bran oil.

7. The edible oil of claim 1 which is a mixture of a rice bran oil and a palm oil.

8. A food product comprising the oil of claim 1.

9. An edible oil comprising about 20 to 60% of non-saponifiable components, said non-saponifiable components comprising (i) at least one tocotrienol or tocopherol, (ii) at least one free sterol or sterol ester, and iii) at least one cycloartenol, wherein the ratio of the amounts of said components i):(ii):(iii) is from about 1:0.5:0.05 to about 1:5:0.05.

10. The oil of claim 9 wherein said ratio is about 1:1:0.05.

11. A method of making an anti-cholesterolemic edible oil comprising the steps of a) providing an edible oil, and b) adjusting the content of tocopherols, tocotrienols, free sterols, sterol esters and cycloartenols of said edible oil, such that said oil comprises about (i) 10 to 30% of tocopherols, tocotrienols or combinations thereof, (ii) about 2 to 20% of free sterols; (iii) about 2 to 20% of sterol esters; (iv) about 0.1 to 1.0% of cycloartenols, wherein all percentages are weight/weight.

12. The method of claim 11 wherein in step a) said edible oil includes at least one saturated fat, and in step b) the content of saturated fat of said edible oil is adjusted such that said edible oil comprises about 7 to 19% of saturated fat.

13. The method of claim 11 wherein after step a) said edible oil is substantially free of trans fatty acids.

* * * * *